United States Patent [19]

Sato et al.

[11] Patent Number: 4,904,737

[45] Date of Patent: Feb. 27, 1990

[54] ACTIVE-ENERGY-RAY CURABLE COATING COMPOSITION

[75] Inventors: Mitsuo Sato, Nagoya; Masaki Niimoto, Tajimi, both of Japan

[73] Assignee: Mitsubishi Rayon Co., Ltd., Tokyo, Japan

[21] Appl. No.: 129,486

[22] Filed: Dec. 7, 1987

[30] Foreign Application Priority Data

Dec. 8, 1986 [JP] Japan .................. 61-290606

[51] Int. Cl.$^4$ .................. C08F 261/06; C08F 263/02; C08F 265/02; C08F 265/06

[52] U.S. Cl. ...................... 525/286; 522/96; 522/42; 522/121; 522/149; 525/289; 525/290

[58] Field of Search ............... 522/121; 525/289, 290, 525/286

[56] References Cited

U.S. PATENT DOCUMENTS

| | | | |
|---|---|---|---|
| 4,141,868 | 2/1979 | Emmons | 525/289 |
| 4,145,503 | 3/1979 | Emmons | 525/290 |
| 4,199,492 | 4/1980 | Roth . | |
| 4,261,872 | 4/1981 | Emmons | 525/290 |
| 4,296,227 | 10/1987 | Seeburger et al. . | |
| 4,520,184 | 5/1985 | Van Eanam . | |
| 4,590,101 | 5/1986 | Knapczyk . | |
| 4,634,738 | 1/1987 | Santer . | |
| 4,670,308 | 6/1987 | Knapczyk . | |

FOREIGN PATENT DOCUMENTS 56-144994 11/1981 Japan .
56-148580 11/1981 Japan .
61-114898 6/1986 Japan .

*Primary Examiner*—John C. Bleutge
*Assistant Examiner*—Arthur H. Koeckert
*Attorney, Agent, or Firm*—Cushman, Darby & Cushman

[57] ABSTRACT

An active-energy-ray curable coating composition comprising 99 to 50 parts by weight of an acrylic copolymer (A) having (meth)acryloyloxy groups linked to functional groups of side chains and 1 to 50 parts by weight of an unsaturated compound (B) having two or more crosslinkable bonds.

13 Claims, No Drawings

ACTIVE-ENERGY-RAY CURABLE COATING COMPOSITION

BACKGROUND OF THE INVENTION

This invention relates to an active-energy-ray curable coating composition and more particularly it relates to active-energy-ray curable compositions comprising an acrylic copolymer having (meth)acrylyloxy groups linked to functional groups of side chains and an unsaturated compound having two or more crosslinkable bonds.

In recent years, active-energy-ray curable coating compositions have been used in various fields by taking advantage of the excellent surface hardness and mar resistance of cured coating films formed therefrom. However, in some cases, they could not be used in dry film resists, transfer foils, etc., which require attachment of a film or additional coating immediately after coating.

The reason for this disadvantage is that conventional active-energy-ray curable coating compositions are composed mainly of monomers or liquid oligomers as highly volatile components. Even when a solvent good in drying characteristics or a solid oligomer is used, a coating film formed by coating the resulting composition is poor in dry tack and is sticky for a long period of time, resulting in retention of tack.

To improve these tacky films it is known to blend a thermoplastic resin which is good in dry tack, such as acrylic resin or nitrocellulose lacquer, with these conventional active-energy-ray curable coating compositions. However, since such thermoplastic resins cannot be cured by active energy rays, these blends provide a coating composition which is inferior to conventional active-energy-ray coating compositions in film performances such as surface hardness, mar resistance, and wear resistance after irradiation with active energy rays. Thus, prior to our discovery, no coating composition provided the performance characteristics discussed above when cured by irradiation with active energy rays after processing, such as attachment of a film or additional coating immediately after coating, as in the case of use in the above-mentioned dry film resists, transfer foils, etc.

Exemplary of these conventional problems is that which arises in providing active-energy-ray curable coating compositions for transfer foils. In transfer foils used for decorating plastic molded articles, thermoplastic resins such as halogenated rubber resins and thermoplastic acrylic resins have heretofore been used as a varnish release layer which forms the surface of a final product after decoration. However, this method is disadvantageous in that the transfer foils are insufficient in surface hardness and chemical resistance. Therefore, it has been proposed that a resin curable by active energy rays, such as ultraviolet rays, be used as a varnish release layer and cured after release to form the surface of final product.

For example, Japanese Patent Application Kokai (Laid-Open) No. 144994/81 discloses that a varnish release layer is formed by using a coating composition prepared by blending a reactive diluent with urethane acrylate obtained by reacting an urethane prepolymer having an isocyanate group at the end (obtained by reacting a polyol with a dissocyanate) with an acrylate having a hydroxyl group, or by blending a reactive diluent with an epoxyacrylate obtained by ester-addition of acrylic acid to an epoxy resin. Japanese Patent Application Kokai (Laid-Open) No. 148580/81 discloses that such a coating composition as described above is used in a bonding layer between a patterned layer and an object on which transfer printing is to be conducted.

Japanese Patent Application Kokai (Laid-Open) Nos. 49591/82, 171988/83 and 171989/83 disclose the formation of a varnish release layer using an ultraviolet ray curable coating composition or an electron ray curable coating composition.

However, when desired printing of a pattern or the like on such a conventional varnish release layer as explained above is attempted, no beautiful printed surface is formed because the varnish release layer is insufficient in drying characteristics and hence is sticky for a long period of time. Furthermore, even when printing can be achieved, release of a release film after transfer is difficult. We conjecture that this is so because conventional active-energy-ray curable coating compositions comprise liquid oligomers as their main constituent. Indicative of this is the observation that even when a solvent good in drying characteristics is used, the coated surface is still sticky and hence retains tack after evaporation of the solvent.

Accordingly, it would be desirable in the art to have an active-energy-ray curable coating composition which is so improved in dry tack that a pattern or the like can be beautifully printed in production of a transfer foil, and which not only cures well when irradiated after transfer to a molded article or the like and provides easy release of a release film, but also yields a coating film after irradiation which has good performance characteristics, such as pencil hardness, mar resistance, wear resistance, chemical resistance, ligh resistance, weather resistance, heat resistance, etc. The performance characteristics sought in any particular application will depend upon the use of the coating film.

SUMMARY OF THE INVENTION

The present invention is directed to an active-energy-ray curable coating composition which is excellent not only in dry tack but also in performance characteristics, such as pencil hardness, mar resistance, wear resistance, etc., of the coating film after irradiation with active energy rays.

The present invention is further directed to an active-energy-ray curable coating composition which after irradiation yields a cured coating film excellent in performance characteristics, such as light resistance, weather resistance, and heat resistance, which may be desirable for certain uses.

The active-energy-ray curable coating composition provided by this invention comprises 99 to 50 parts by weight of an acrylic copolymer (A) having (meth)acrylyloxy groups linked to functional groups of side chains and 1 to 50 parts by weight of an unsaturated compound (B) having two or more crosslinkable double bonds. The acrylic copolymer (A) is more preferably one which comprises as its comonomer at least one member selected from the group consisting of compounds represented by the following general formula I and compounds represented by the general formula II.

General formula I:

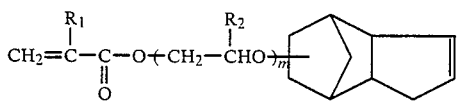

wherein each of $R_1$ and $R_2$ is a hydrogen atom or a methyl group, and m is zero or an integer of 1 to 4.

General formula II:

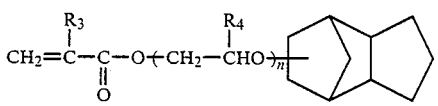

wherein each of $R_3$ and $R_4$ in a hydrogen atom or a methyl group, and n is zero or an integer of 1 to 4.

Such active-energy-ray curable coating compositions provide upon irradiation a cured coating composition which is characterized in that excellent dry tack and excellent performance characteristics, such as pencil hardness, mar resistance and wear resistance of cured coating film, etc. can be imparted to an active-energy-ray curable coating composition by blending the above-mentioned acrylic copolymer (A) with the above-mentioned unsaturated compound (B) in a specific ratio. Another characteristic of this invention is that not only marked improvement in light resistance of cured coating film but also excellent weather resistance, heat resistance, etc. can be achieved by used of a copolymer obtained by using as a comonomer at least one member selected from the group consisting of compounds of the above general formula I and compounds of the above general formula II.

The acrylic copolymer (A) used in this invention has (meth)acrylyloxy groups introduced by utilization of the functional groups of side chains of acrylic copolymer, and is a copolymer obtained by reacting (1) a (meth)acrylic acid ester monomer; (2) if desired, a monomer copolymerizable with the (meth)acrylic acid ester monomer of 1; (3) a monomer having a functional group attachable to (meth)acrylyloxy group for introducing a (meth)acrylyloxy group as a side chain; and (4) a compound for introducing (meth)acrylyloxy groups.

DETAILED DESCRIPTION OF THE PREFERRED EMBODIMENTS

The acrylic acid ester monomer of 1 includes, for example, (meth)acrylic acid alkyl esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, and the like.

The monomer of 2, optionally used, is copolymerizable with the monomer of 1 and includes aromatic vinyl monomers such as styrene, vinyl-toluene, and the like, vinyl cyanide monomer such as acrylonitrile, vinyl esters such as vinyl acetate, and vinyl propionate, etc.

The monomer of 3 has a functional group attachable to (meth)acrylyloxy group, such as a glycidyl group, an isocyanate group, an acid amide group (aminocarbonyl group), a carboxyl group, a hydroxyl group, an amino group, etc., which is capable of serving as the above-mentioned functional group of side chain for introducing (meth)acrylyloxy groups. The monomer of 3 includes, for example, copolymerizable monomers such as glycidyl (meth)acrylate, isocyanatoethyl (meth)acrylate, N-acrylamide, N-methoxymethylacrylamide, N-butoxymethylacrylamide, itaconic diamide, fumaric amide, phthalic amide, (meth)acrylic acid, itaconic acid, fumaric acid, maleic acid, 2-hydroxyethyl (meth)acrylate, 2-hydroxypropyl (meth)acrylate, 4-hydroxybutyl (meth)acrylate, dimethylaminoethyl (meth)acrylate, dietheylaminoethyl (meth)acrylate, t-butylaminoethyl (meth)acrylate.

The compound of 4 is used for introducing (meth)acrylyloxy groups and includes the following compounds. When the functional group which reacts with a (meth)acryloyloxy group is a glycidyl group, there may be exemplified unsaturated carboxylic acids such as (meth)acrylic acid, itaconic acid, and the like. When the functional group is an isocyanate group, there may be exemplified compounds having a hydroxyl group and a (meth)acrylyloxy group such as 2-hydroxyethyl (meth)acrylate, 2-hydroxypropyl (meth)acrylate, 4-hydroxybutyl (meth)acrylate, and the like. When the functional group is a carboxyl group, there may be exemplified compounds having a glycidyl group and a (meth)acrylyloxy group such as glycidyl (meth)acrylate, and the like; and compounds having a hydroxyl group and a (meth)acrylyloxy group such as 2-hydroxyethyl (meth)acrylate, 2-hydroxypropyl (meth)acrylate, 4-hydroxybutyl (meth)acrylate, and the like. When the functional group is a hydroxyl group there may be exemplified compounds having an isocyanate group and a (meth)acrylate group such as isocyanatoethyl (meth)acrylate, and the like; unsaturated mono- and dicarboxylic acids such as (meth)acrylic acid, itaconic acid an the like; and esters of these carboxylic acids. When the functional group is an acid amide group, there may be exemplified compounds having a (meth)acrylyloxy group and a glycidyl group or a hydroxyl group such as glycidydl (meth)acrylate, 2-hydroxyethyl (meth)acrylate, and the like. When the functional group is an amino group, there may be exemplified compounds having a (meth)acrylyloxy group and a carboxyl group such as (meth)acrylic acid and the like.

In general, the amount of the (meth)acrylic acid ester monomer of 1 used is 1 to 99 parts by weight; that of the monomer of 2, copolymerizable with the monomer of 1, is up to equimolar with the monomer of 1 and ranges from 0 to 97 parts by weight; that of the monomer of 3 is 1 to 50 parts by weight; and that of the compound of 4 is up to equimolar with the functional group of the monomer of 3 for introducing (meth)acrylyloxy groups and is 1 to 50 parts by weight. When light resistance is required, compound(s) of the above general formula I and/or general formula II is used in place of a part of the monomer of 1. However, the total amount of these compounds used is preferably 50 parts by weight or less because when the amount exceeds 50 parts by weight, some of the characteristics of the resulting coating composition may be unfavorably affected.

Specific examples of the compounds of the above general formula I and the compounds of the above general formula II include dicyclopentenyl (meth)acrylate, dicyclopentenyloxyethyl (meth)acrylate, dicyclopentenyloxypropyl (meth)acrylate, tricyclo[5.2.1.0$^{2.6}$]-deca-8-yl (meth)acrylate (hereinafter referred to as "tricyclodecyl (meth)acrylate" in this specification).

Among them, particularly preferable compounds are tricyclodecyl (meth)acrylate represented by the structural formula:

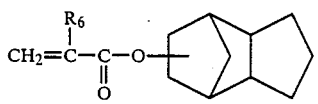

wherein $R^5$ is a hydrogen atom or a methyl group; and tricyclodecyl methacrylate is more preferable.

The acrylic copolymer (A) can be synthesized by a conventional process, for example, a process which comprises subjecting the monomers of 1, 3 and, optionally, 2 to solution polymerization, and then introducing the compound of 4, i.e., the compound having a (meth-)acrylyloxy group, as such by addition reaction. In carrying out these reactions, there can be used conventional solvents, polymerization initiators, polymerization inhibitors, synthesis catalysts, etc.

The weight average molecular weight of the acrylic copolymer (A) is preferably 20,000 to 200,000. When it is less than 20,000, the resulting active-energy-ray curable coating composition tends to be less sufficient in dry tack, so that it becomes difficult to obtain a beautiful printed layer in the form of release varnish. When it is more than 200,000, the resulting coating composition tends to have a high viscosity, resulting in low workability at the time of forming a transfer foil.

As the acrylic copolymer (A) used in this invention, the following compositions are preferred, particularly from the viewpoint of improvement in performance characteristics, such as the surface hardness, mar resistance, chemical resistance, light resistance, weather resistance, etc.:

(a) adducts of a copolymer of methyl methacrylate (as the monomer of 1), glycidyl methacrylate (as the monomer of 3) and tricyclodecyl methacrylate (as the compound of the general formula II) with acrylic acid (as the compound of 4) (although the phrases in the parentheses are hereinafter omitted, examples of the individual monomers are described below in the order in which the monomers are described above in the parenthesis);

(b) adducts of a copolymer of methyl methacrylate, ethyl acrylate, isocyanate and tricyclodecyl methacrylate with 2-hydroxyethyl acrylate;

(c) condensation products between a copolymer of methyl methacrylate, 4-hydroxybutyl acrylate and tricyclodecyl methacrylate and acrylic acid;

(d) condensation products between a copolymer of methyl methacrylate, 2-hydroxyethyl methacrylate and tricyclodecyl methacrylate and methyl acrylate by ester interchange;

Exemplary particularly preferred acrylic copolymers are those prepared from 1 to 50 parts by weight of tricyclodecyl methacrylate, i.e., a compound of the general formula II, 1 to 49 parts by weight of the (meth-)acrylic acid ester monomer of 1, 1 to 50 parts by weight of the monomer of 3 having a functional group attachable to (meth)acrylyloxy group for introducing a (meth-)acrylyloxy group as a side chain, and the compound of 4 for introducing (meth)acrylyloxy groups in an amount of 1 to 50 parts by weight which is equimolar with the functional group.

In the preparation of preferred acrylic copolymer (A), when the amount of tricyclodecyl methacrylate is less than 1 part by weight, the resulting coating composition is deteriorated in adhesive properties after subjecting the coating to the light resistance test, while when it exceeds 50 parts by weight, the resulting coating composition has a low printability for overcoating ink, so that beautiful printing is not obtained. When the amount of the monomer having a functional group for introducing (meth)acrylyloxy groups into the side chains of the acrylic copolymer, i.e., glycidyl acrylate, ethyl acrylate isocyanate, 4-hydroxybutyl acrylate, or 2-hydroxyethyl methacrylate, is less than 1% by weight, the wear resistance after curing is lowered; when it exceeds 50 parts by weight, the stability of the resulting coating composition is lessened.

Unsaturated compound (B) having two or more crosslinkable double bonds includes dipentaerythritol tetraacrylate, 1,6-hexanediol di(meth)acrylate, neopentyl glycol di(meth)acrylate, ethylene glycol di(meth)acrylate, tripropylene glycol di(meth)acrylate, trimethylolpropane tri(meth)acrylate, pentaerythritol tri(meth)acrylate, bisphenol-A diglycidyl ether di(meth)acrylate, bisphenol-A dioxyethylene glycol ether di(meth)acrylate, bisphenol-A bisdioxyethylene glycol ether di(meth)acrylate, dipentaerythritol penta(meth)acrylate, dipentaerythritol hexa(meth)acrylate, pentaerythritol tri(meth)acrylate, pentaerythritol tetra(meth)acrylate, trimethylpropane tri(meth)acrylate, compounds obtained by reacting 2-hydroxyethyl (meth)acrylate with a reaction product of toluene diisocyanate (hereinafter abbreviated as TDI) with trimethylolpropane, a compound obtained by reacting TDI with pentaerythritol triacrylate, trifunctional or higher-order polyfunctional urethane (meth)acrylates obtained by reacting polyisocyanate with a compound having in the molecule one hydroxyl group and at least two (meth)acrylyloxy groups, epoxypoly(meth)acrylates having two or more (meth)acrylyloxy groups on the average per molecule which are reaction products of an epoxy resin with (meth)-acrylic acid, urethane poly(meth)acrylate having urethane linkages in the main chain and more than two (meth)acrylyloxy groups on the average per molecule, bifunctional or higher-order polyfunctional compounds having (meth)acrylyloxy groups such as polyester poly(meth)acrylates having two or more (meth)acrylyloxy groups on the average per molecule which compounds are reaction products of a polyester forming component or a polyester with (meth)acrylyloxy group forming component or a (meth)acrylyloxy group containing compound, unsaturated polyester resins obtained by reacting a polyester resin prepared from a polybasic acid and a polyhydric alcohol with maleic anhydride, phthalic anhydride, alkyl alcohol or the like. Particularly preferred from the viewpoint of film properties, in particular, surface hardness, mar resistance, chemical resistance, etc. attained by irradiation with active energy rays after transfer, unsaturated compounds having three or more crosslinkable double bonds, in particular, trifunctional or higher-order polyfunctional ones which have acrylyloxy groups, such as dipentaerythritol tetraacrylate, dipentaerythritol pentaacrylate, dipentaerythritol hexaacrylate, pentaerythritol triacrylate, pentaerythritol tetraacrylate, trimethylpropane triacrylate, or a compound obtained by reacting 2-hydroxyethyl acrylate with a reaction product of TDI with trimethylolpropane.

The proportion of the acrylic copolymer (A) to the compound (B) should be 99 to 50 parts by weight of (A) to 1 to 50 parts by weight (B). When the amount of (A) exceeds 99 parts by weight and that of (B) is less than 1 part by weight, the performance characteristics of the film, in particular, surface hardness, mar resistance and chemical resistance attained by irradiation with active energy rays after transfer tend to be insufficient. When the amount of (A) is less than 50 parts by weight and the amount of (B) exceeds 50 parts by weight, the resulting active-energy-ray curable coating composition tends to be insufficient in dry tack. Therefore, such amounts of (A) and (B) are not desirable.

The coating composition of this invention can be cured using conventional active energy rays, for example, ultraviolet rays, electron rays, gamma rays, etc.

When ultraviolet rays are used as the active energy rays, a photopolymerization initiator can be incorporated into the coating composition prior to irradiation. Exemplary photopolymerization initiators include diethoxyacetophenone, 2-hydroxy-2-methyl-1-phenylpropan-1-one, isobutylbenzoin ether, isopropylbenzoin ether, benzyldimethylcumene, 1-hydroxycyclohexylphenyl ketone, benzophenone, 2-chlorothioxanthron, 2-ethylanthraquinone, 2-chloroethylanthraquinone, 4-butyl-anthraquinone, 3,3',4,4'-tetra-(t-butylperoxycarbonyl)benzophenone, 2-methyl-1-[4-(methylthio)-penyl]-2-morpholino-propane-1, 1-(4-isopropylphenyl)-2-hydroxy-2-methylpropan-1-one, methylphenyl glyoxylate, ethylphenyl glyoxylate, and canphorquinone. 1-hydroxy-cyclohexyl phenyl ketone, methylphenyl glyoxylate and ethylphenyl glyoxylate are preferred from the viewpoint of curability, odor of coating film, and yellowing after using.

A suitable amount of the photopolymerization initiator is between 0.1 and 10 parts by weight per 100 parts by weight of the sum of (A) and (B). When it is outside this range, the coating composition is deteriorated in storage stability or in curability after transfer.

Other conventional additives may be included in the curable coating composition of this invention so long as they have no detrimental effect on the coating composition after inrradiation. For example, leveling agents, slip agents, and cellulose acetate butylate resins and nitrocellulose lacquers for improving the dry tack may be added.

Conventional antioxidants and ultraviolet ray absorbers may also be added to the curable coating composition of this invention in order to further improve performance properties, such as weather resistance and light resistance.

A process for producing a transfer foil using the active-energy-ray curable coating composition of this invention is as follows. The curable coating composition is coated on a substrate film of polyethylene terephthalate, polypropylene, polyethylene or the like by roll coating, gravure coating or the like, and if necessary, dried or irradiated with active energy rays, after which a patterned layer is formed thereon by gravure printing, screen printing, offset printing or the like, and then an adhesive layer is formed on the patterned layer. If necessary, the coating composition of this invention may be used for forming the adhesive layer.

The pattern or the like of the transfer foil thus obtained is transferred to an object on which transfer printing is to be conducted, by a conventional method of transfer by application of heat and pressure. Consequently, the adhesive layer, the patterned layer and the active-energy-ray curable coating composition are adhered to the surface of said object in this order. When the coating composition is then irradiated with active energy rays, a transfer-printed layer excellent in surface hardness, mar resistance and chemical resistance is formed.

EXAMPLES

This invention is further illustrated with the following examples, in which all parts are by weight. The examples set forth should not be construed as limiting the scope of the invention.

SYNTHESIS EXAMPLE 1

In a 1-liter flask equipped with a condenser, thermometer and stirrer was placed 100 parts of methyl ethyl ketone (MEK) as a solvent, and after the temperature in the flask was raised to about 80° C., a monomer solution prepared by dissolving 0.5 part of azobisisobutyronitrile in a mixture of 35 parts of tricyclodecyl methacrylate, 35 parts of methyl methacrylate and 30 parts of glycidyl methacrylate was added dropwise from a dropping funnel over a period of 4 hours. The polymerization initiator was added to adjust the polymerization conversion to 100%, followed by adding thereto MEK to adjust the solid content to 48%, whereby the polymerization was completed. To the resin solution thus obtained were added 0.1 part of hydroquinone (HQ) as a polymerization inhibitor and 2 parts of triethylamine (TEA) as a synthesis catalyst, and 15.2 parts of acrylic acid was reacted therewith to obtain an acrylic copolymer having a weight average molecular weight of about 78,000.

SYNTHESIS EXAMPLE 2

In the same apparatus as in Synthesis Example 1 was placed 100 parts of ethyl acetate, and after the temperature in the flask was raised to about 80° C., a monomer solution prepared by dissolving 1 part of azobisisobutyronitrile in a mixture of 50 parts of tricyclodecyl methacrylate, 40 parts of methyl methacrylate and 10 parts of ethyl methacrylate isocyanate (isocyanatoethyl methacrylate) was added dropwise from a dropping funnel over a period of 4 hours. The polymerization initiator was added to adjust the polymerization conversion to 100%, followed by adding thereto MEK to adjust the solid content to about 40%, whereby the polymerization was completed. To the resin solution thus obtained were added 0.2 part of a polymerization inhibitor, methylhydroquinone (MHQ) and 2 parts of a synthesis catalyst, triethylamine, and 7.5 parts of 2-hydroxyethyl acrylate was reacted therewith to obtain an acrylic copolymer having a weight average molecular weight of about 80,000.

SYNTHESIS EXAMPLE 3

In the same apparatus as in Synthesis Example 1 was placed 100 parts of toluene as a solvent, and after the temperature in the flask was raised to 80° C., a monomer solution prepared by dissolving 1 part of azobisisobutylonitrile in a mixture of 35 parts of tricyclodecyl methacrylate, 35 parts of methyl methacrylate and 30 parts of 4-hydroxybutyl acrylate was added dropwise from a dropping funnel over a period of 4 hours. The polymerization initiator was added to adjust the polymerization conversion to 100%, followed by adding thereto toluene to adjust the solid content to about 40%, whereby the polymerization was completed. To the resin solution thus obtained were added 0.2 part of HQ as a polymerization inhibitor and 1 part of sulfuric acid as a synthesis catalyst, and the temperature was gradually raised. After 15 parts of acrylic acid was added, condensation was carried out at 100° C. or higher and the water was removed, after which the sulfuric acid as synthesis catalyst was washed off, and MEK was added to the residue as a solvent to obtain the desired compound.

SYNTHESIS EXAMPLES 4 TO 9

The compounds 4, 6 and 8 listed in Table 1 were obtained in the same manner as Synthesis Example 1; compound 5 was obtained in the same manner as Synthesis Example 2; and compounds 7 and 9 were obtained in the same manner as Synthesis Exammple 3.

The physical properties were measured as follows:

Weight Average Molecular Weight: GPC, manufactured by Toyo Soda HLC-802UR, utilizing known weights of polystyrene as a standard; Pencil Hardness: JIS K-5400, 6.14 (Pencil testing method); Adhesive Properties: JIS D0202, 8.12 (Using a mesh screen); Light Resistance: JID D-0202, 8.12 exposure to fadeometer for 100 hrs.; Mar Resistance: Evaluated with naked eye after 50 rubs with steel wool No. 0000; RCA Wearability: RCA wearing tester (Manufactured by The Norman Tool and Stamping Company).

TABLE 1

| | Compound 1 | Compound 2 | Compound 3 | Compound 4 | Compound 5 | Compound 6 | Compound 7 | Compound 8 | Compound 9 |
|---|---|---|---|---|---|---|---|---|---|
| | MEK 100 parts | ethyl acetate 100 parts | Toluene 100 parts | MEK 100 parts | MEK 100 parts | MEK 100 parts | MEK 100 parts | MEK 100 parts | MEK 100 parts |
| | | | | | Solvent for early polymerization | | | | |
| Monomer composition of copolymer | | | | | | | | | |
| Tricyclodecyl methacrylate | 35 | 50 | 35 | 60 | | 35 | 35 | | |
| Dicyclopentenyl methacrylate | 35 | 40 | 35 | 10 | 35 | | 35 | 60 | 60 |
| Methyl methacrylate | | | | | 35 | 35 | | | |
| Styrene | | | | | | 30 | | 30 | |
| Glycidyl methacrylate | 30 | | | 30 | | | | | |
| isocyanatoethyl (meth)acrylate | | 10 | | | | | | | |
| 4-Hydroxybutyl acrylate | | | 30 | | | | | | 30 |
| 2-Hydroxyethyl methacrylate | | | | | 30 | | 30 | | |
| Polymerization initiator in dropped monomer | AIBN 0.5 | AIBN 1 | AIBN 1 | AIBN 1 | AIBN 1 | AIBN 1 | AIBN 1 | AIBN 1 | AIBN 1 |
| Polymerization inhibitor | HQ 0.1 | MHQ 0.2 | HQ 0.2 | HQ 0.2 | HQ 0.2 | HQ 0.2 | HQ 0.2 | HQ 0.2 | HQ 0.2 |
| Synthesis catalyst | TEA 2 | TEA 2 | SA 1 | TEA 2 | TEA 2 | TEA 2 | TTB 1 | TEA 2 | SA 1 |
| Compound for introducing (meth)acryloyloxy groups | | | | | | | | | |
| Acrylic acid | 15.2 | | 15 | 15.2 | | 15.2 | | 15.2 | 15 |
| 2-Hydroxyethyl acrylate | | 7.5 | | | 32.5 | | | | |
| isocyanatoethyl (meth)acrylate | | | | | | | 20 | | |
| Methyl acrylate | | | | | | | | | |
| Weight average molecular weight | 85000 | 80000 | 75000 | 78000 | 82000 | 76000 | 80000 | 83000 | 82000 |

Note
TTB: tetra-t-butoxide
SA: sulfuric acid

EXAMPLES 1 TO 10

An unsaturated compound (B) having two or more crosslinkable double bonds and a photopolymerization initiator were blended with each of the compounds obtained in Synthesis Examples 1 to 9, and if necessary the resulting blend was diluted with a solvent. Thus, ultraviolet curable coating compositions were obtained. The blending ratios are shown in Table 2.

Each ultraviolet curable coating composition was coated on a release polyester film to a thickness of 5 μm and dried by means of hot air at 60° to 80° C. for 2 to 3 seconds. Then, the dry tack was checked with fingers. Printing on a similarly prepared coating was conducted, after which the beauty of the print was evaluated. Subsequently, an adhesive layer was formed on the printed surface to obtain a transfer foil, which was then used for transfer printing on an ABS molded article. After the release film was released, the coating on the molded article was irradiated with ultraviolet rays from two 80 W/cm lamps at a speed of conveyor of 4 m/min, and the hardness, adhesive properties, mar resistance and RCA wearability of the coating film thus formed were examined. Further, the coating film was subjected to a 100 hours light resistance test by means of a fadeometer, and its adhesive properties were examined.

The results obtained were shown together in Table 2.

TABLE 2

| | Example | | | | | | | | | |
|---|---|---|---|---|---|---|---|---|---|---|
| | 1 | 2 | 3 | 4 | 5 | 6 | 7 | 8 | 9 | 10 |
| Compound 1. (Solid content) | 80 | | | | | | 80 | | | |
| Compound 2. (Solid content) | | 80 | | | | | | | | |
| Compound 3. (Solid content) | | | 80 | | | | | | | |
| Compound 4. (Solid content) | | | | 80 | | | | | | |
| Compound 5. (Solid content) | | | | | 80 | | | | | |
| Compound 6. (Solid content) | | | | | | 80 | | | | |
| Compound 7. (Solid content) | | | | | | | | 80 | | |
| Compound 8. (Solid content) | | | | | | | | | 80 | |
| Compound 9. (Solid content) | | | | | | | | | | 80 |
| Dipentaerythritol pentaacrylate | 20 | 20 | 20 | 20 | 20 | 20 | | 20 | 20 | 20 |
| Pentaerythritol triacrylate | | | | | | | 20 | | | |
| 1-Hydroxycyclohexyl phenyl ketone | 4 | 4 | 4 | 4 | 4 | 4 | 4 | 4 | 4 | 4 |
| Dry tack | o | o | o | o | o | o | o | o | o | o |
| Beauty of print | o | o | o | Δ | o | o | o | o | o | o |
| Pencil hardness | 3H | 2H | 3H | 3H | 3H | 3H | 2H | 2H | 3H | 3H |
| Mar resistance | o | o | o | o | o | o | o | o | o | o |
| RCA wearability | >100 | >100 | >100 | >100 | >100 | >100 | 22 100 | >100 | >100 | >100 |
| Adhesive properties | o | o | o | o | o | o | o | o | o | o |
| Light resistance* | o | o | o | o | o | o | o | o | x | x |

Note:
o: Satisfactory,
Δ: acceptable but unsatisfactory,
x: not acceptable
*adhesive properties after light resistance test It can be seen from Table 2 that, although the coating compositions containing as acrylic copolymers other than those obtained by use of monomers of the above general formula I or II (Examples 9 and 10) provide cured coating films which are excellent in dry tack and in performance characteristics such as surface hardness, mar resistance and wear resistance, the cured coating films resulting from coating compositions obtained by use of the monomers of the general formula I or II also have excellent resistance to deterioration on exposure to light.

As is clear from the above, the coating composition of this invention has the following advantages: It facilitates processing such as attachment of a film, additional coating, etc. can be carried out immediately after coating; It provides a cured coating film on irradiation after processing excellent not only in surface hardness, mar resistance and wear resistance but also in light resistance, weather resistance and heat resistance. For example, when used in a transfer foil, the coating composition dries to the touch immediately after being coated on a release film, permits beautiful printing thereon, and gives a transfer foil which is not torn by release of the release film after transfer. Moreover, when a transfer foil using said coating composition is used and irradiated after transfer, there can be obtained a coating film having higher surface hardness and chemical resistance than when a conventional solvent type coating composition is used, and a conventional step of coating an ultraviolet curable coating composition after conducting transfer printing on a molded article can be omitted, so that a high degree of rationalization can be achieved.

What is claimed is:

1. An active-energy-ray curable coating composition comprising
   (i) 99 to 50 parts by weight of an acrylic copolymer (A) having pendant (meth)acryloyloxy groups introduced by the utilization of functional groups of side chains of the acrylic copolymer wherein the functional groups are selected from the group consisting of a glycidyl group, an isocyanate group, a carboxyl group, a hydroxyl group, an acid amide group and an amino group and wherein the acrylic copolymer is obtained by using as a comonomer at least one member selected from the group consisting of

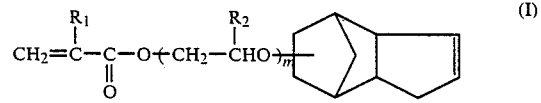

wherein each of $R_1$ and $R_2$ is a hydrogen atom or a methyl group, and m is zero or an integer of 1 to 4,

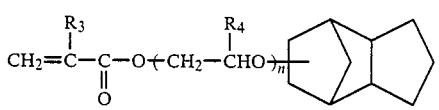 (II)

wherein each of $R_3$ and $R_4$ is a hydrogen atom or a methyl group, and n is zero or an integer of 1 to 4; and (ii) an unsaturated compound (B) having two or more crossinkable double bonds.

2. An active-energy-ray curable coating composition according to claim 1, wherein said acrylic copolymer (A) having pendant (meth)acryoyloxy groups is prepared from (i) 1 to 99 parts by weight of a (meth)acrylic acid ester monomer;

(ii) 0 to 97 parts by weight of a monomer (2) copolymerizable with the (meth)acrylic acid ester monomer selected from the group consisting of aromatic vinyl monomers, a vinyl cyanide monomer and vinyl esters;

(iii) 1 to 50 parts by weight of a monomer (3) having a functional group selected from the group consisting of a glycidyl group, an isocyanate group, an acid amide group, a carboxyl group, a hydroxyl group and an amino group;

(iv) 1 to 50 parts by weight of a monomer (4) having a (meth)acryloyloxy group to provide the pendant (meth)acryloyloxy groups on copolymer (A) wherein the moles of (meth)acryloyloxy groups of monomer (4) is equal to the moles of functional groups of monomer (3); and (v) at least one compound selected from the group represented by Formulae I and II.

3. An active-energy-ray curable coating composition according to claim 1, wherein at least one of the functional groups is selected from the group consisting of hydroxyl group, glycidyl group, and isocyanate group.

4. An active-energy-ray curable coating composition according to claim 1, wherein the compound of the general formula II is represented by the formula:

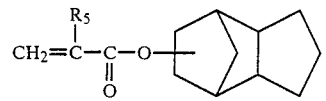

wherein $R_5$ is a hydrogen atom or a methyl group.

5. An active-energy-ray curable coating composition according to claim 1, wherein the unsaturated compound (B) is a trifunctional or higher-order polyfunctional compound having (meth)acrylyloxy groups.

6. An active-energy-ray curable coating composition according to claim 2, wherein said at least one compound is used in a range of 1 to 50 parts by weight.

7. An active-energy-ray curable coating composition according to claim 6, wherein the compound of the general formula I and/or the general formula II is represented by the formula:

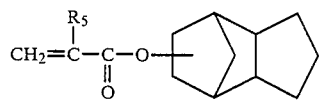

wherein $R_5$ is a hydrogen atom or a methyl group.

8. An active-energy-ray curable coating composition according to claim 7, wherein $R_5$ is a methyl group.

9. An active-energy-ray curable coating composition according to claim 2 or 6, wherein the (meth)acrylic acid ester monomer is methyl acrylate.

10. An active-energy-ray curable coating composition according to claim 9, wherein monomer (4) is selected from the group consisting of acrylic acid, methyl acrylate and 2-hydroxyethyl acrylate.

11. An active-energy-ray curable coating composition according to claim 10, wherein the monomer having a functional group attachable to (meth)acrylyloxy group for introducing a (meth)acrylyloxy group as a side chain is selected from the group consisting of glycidyl methacrylate, isocyanatoethyl methacrylate and 2-hydroxyethyl acrylate.

12. An active-energy-ray curable coating composition according to claim 1 or 5, wherein said unsaturated compound (B) is pentaerythritol pentaacrylate or pentaerythritol triacrylate.

13. An active-energy-ray curable coating composition according to claim 12, wherein the amount of the unsaturated compound (B) is 20 parts by weight.

* * * * *